US008834278B2

(12) United States Patent  (10) Patent No.: US 8,834,278 B2
Longman  (45) Date of Patent: *Sep. 16, 2014

(54) SYSTEM AND METHOD FOR USING A GAME CONTROLLER DEVICE FOR ELECTRONIC TRADING

(75) Inventor: James A. Longman, Clapham/London (GB)

(73) Assignee: BGC Partners, Inc., New York, NY (US)

( * ) Notice: Subject to any disclaimer, the term of this patent is extended or adjusted under 35 U.S.C. 154(b) by 1642 days.

This patent is subject to a terminal disclaimer.

(21) Appl. No.: 11/738,884

(22) Filed: Apr. 23, 2007

(65) Prior Publication Data

US 2007/0191114 A1   Aug. 16, 2007

Related U.S. Application Data

(63) Continuation of application No. 10/759,693, filed on Jan. 15, 2004, now Pat. No. 7,207,885.

(51) Int. Cl.
*A63F 13/00* (2014.01)
*G06F 3/0481* (2013.01)
*G06F 3/0338* (2013.01)

(52) U.S. Cl.
CPC ............ *G06F 3/0338* (2013.01); *G06F 3/0481* (2013.01)
USPC .................... 463/43; 463/36; 463/37; 463/38; 345/156; 345/172

(58) Field of Classification Search
USPC ................ 463/36–39, 47; 273/148 R, 148 B; 345/156, 168–172; 705/1.1, 37
See application file for complete search history.

(56) References Cited

U.S. PATENT DOCUMENTS

| 4,720,758 | A | 1/1988 | Winslow |
| 5,243,331 | A | 9/1993 | McCausland et al. ........ 345/172 |
| 5,315,364 | A | 5/1994 | Arion et al. ..................... 356/32 |
| 5,321,765 | A | 6/1994 | Costello ........................ 382/125 |
| 5,461,217 | A | 10/1995 | Claus ........................... 235/380 |
| 5,605,505 | A | 2/1997 | Han |

(Continued)

FOREIGN PATENT DOCUMENTS

| EP | 0 394 614 A2 | 1/1990 | ............. G06F 3/033 |
| EP | 0 206 565 B1 | 4/1991 | |

(Continued)

OTHER PUBLICATIONS

Search Report under Section 17 for application No. GB0500841.2, Mar. 18, 2005.

(Continued)

*Primary Examiner* — Dmitry Suhol
*Assistant Examiner* — Alex F. R. P. Rada, II
(74) *Attorney, Agent, or Firm* — Thomas D. Bradshaw

(57) ABSTRACT

According to one embodiment, a system for electronic trading is provided. The system includes an interface application having an associated mapping module that defines a plurality of controller signal relationships. Each controller signal relationship associates a game controller signal with a trading system command associated with the electronic trading of financial instruments. The interface application is operable to receive a particular game controller signal, determine the trading system command associated with the particular game controller signal using the mapping module, and communicate the determined trading system command such that the trading system command is executed.

20 Claims, 4 Drawing Sheets

| GAMEPAD CONTROL | TRADING SYSTEM COMMAND |
|---|---|
| D-PAD | CHANGE SELECTED INSTRUMENT IN CURRENT VIEW |
| JOYSTICK A | MOVE CURSOR AROUND SCREEN |
| JOYSTICK B (UP) | PRICE UP |
| JOYSTICK B (DOWN) | PRICE DOWN |
| JOYSTICK B (RIGHT) | SIZE UP |
| JOYSTICK B (LEFT) | SIZE DOWN |
| BUTTON G | BUY |
| BUTTON H | SELL |
| BUTTON G + BUTTON F | BID |
| BUTTON H + BUTTON F | OFFER |
| BUTTON J + BUTTON G | CANCEL BUY |
| BUTTON J + BUTTON H | CANCEL SELL |
| BUTTON J + BUTTON F + BUTTON G | CANCEL BID |
| BUTTON J + BUTTON F + BUTTON H | CANCEL OFFER |
| BUTTON A | PRICE IMPROVEMENT BEST |
| BUTTON J + BUTTON A | CYCLE PRICE IMPROVEMENT LEVEL |
| BUTTON B | DIRECT DEALING (REQUEST FOR QUOTE) |
| BUTTON J + BUTTON B | TWO-WAY DIRECT DEALING (REQUEST FOR QUOTE) |
| BUTTON C | DELETE COMMANDLINE |
| BUTTON J + BUTTON C | BACKSPACE IN COMMANDLINE |
| BUTTON E | LIMIT |
| BUTTON F | MOUSE LEFT CLICK |
| BUTTON J + BUTTON F | MOUSE RIGHT CLICK |
| BUTTON D + D-PAD | CHANGE SELECTED FIELD WITHIN SELECTED INSTRUMENT |

(56) References Cited

U.S. PATENT DOCUMENTS

| | | | |
|---|---|---|---|
| 5,644,113 A | 7/1997 | Date et al. | |
| 5,853,326 A | 12/1998 | Goto et al. | 463/37 |
| 5,896,125 A * | 4/1999 | Niedzwiecki | 345/168 |
| 5,903,880 A | 5/1999 | Biffar | |
| 5,991,431 A | 11/1999 | Borza | |
| 6,071,194 A | 6/2000 | Sanderson et al. | 463/37 |
| 6,105,006 A | 8/2000 | Davis et al. | |
| 6,184,665 B1 | 2/2001 | Salina et al. | |
| 6,213,880 B1 | 4/2001 | Sim | 463/37 |
| 6,231,880 B1 | 5/2001 | Perrine | |
| 6,251,012 B1 | 6/2001 | Horigami et al. | |
| 6,272,474 B1 | 8/2001 | Garcia | |
| 6,311,167 B1 | 10/2001 | Davis et al. | |
| 6,400,996 B1 | 6/2002 | Hoffberg et al. | 700/83 |
| 6,422,941 B1 | 7/2002 | Thorner et al. | 463/30 |
| 6,505,175 B1 | 1/2003 | Silverman et al. | 705/37 |
| 6,538,636 B1 | 3/2003 | Harrison | 345/156 |
| 6,585,599 B1 | 7/2003 | Horigami et al. | |
| 6,615,299 B1 | 9/2003 | Chu et al. | 710/65 |
| 6,625,583 B1 | 9/2003 | Silverman et al. | 705/36 |
| 6,727,890 B2 | 4/2004 | Andres et al. | 345/168 |
| 6,938,011 B1 | 8/2005 | Kemp, II et al. | |
| 7,106,569 B2 | 9/2006 | Liu et al. | |
| 7,116,310 B1 * | 10/2006 | Evans et al. | 345/156 |
| 7,138,775 B2 | 11/2006 | Sugimoto et al. | |
| 7,138,819 B2 | 11/2006 | Hashimoto | |
| 7,167,860 B1 | 1/2007 | Black et al. | |
| 7,207,885 B2 | 4/2007 | Longman | 463/37 |
| 7,228,289 B2 | 6/2007 | Brumfield et al. | |
| 8,208,237 B2 | 6/2012 | Celenza et al. | |
| 8,452,695 B2 | 5/2013 | Longman et al. | |
| 8,469,808 B2 | 6/2013 | Longman et al. | |
| 2001/0040562 A1 | 11/2001 | Masudaya | |
| 2001/0045938 A1 | 11/2001 | Willner et al. | |
| 2001/0053712 A1 | 12/2001 | Yoseloff et al. | 463/1 |
| 2002/0007335 A1 | 1/2002 | Millard et al. | |
| 2002/0070915 A1 * | 6/2002 | Mazza et al. | 345/156 |
| 2002/0099634 A1 | 7/2002 | Coutts et al. | |
| 2002/0099895 A1 | 7/2002 | Landron et al. | 710/303 |
| 2002/0113987 A1 | 8/2002 | Kohli | 358/1.13 |
| 2002/0163597 A1 | 11/2002 | Kelleher et al. | |
| 2002/0165794 A1 | 11/2002 | Ishihara | |
| 2002/0184500 A1 | 12/2002 | Maritzen et al. | |
| 2003/0009411 A1 | 1/2003 | Ram et al. | 705/37 |
| 2003/0018569 A1 | 1/2003 | Eisenthal et al. | 705/37 |
| 2003/0065609 A1 | 4/2003 | Oh | 705/37 |
| 2003/0103038 A1 | 6/2003 | Wong et al. | 345/158 |
| 2003/0103127 A1 | 6/2003 | Khormaei et al. | |
| 2003/0126063 A1 | 7/2003 | Reuter et al. | |
| 2003/0158796 A1 | 8/2003 | Balent | 705/28 |
| 2003/0187771 A1 | 10/2003 | Bulan | |
| 2003/0187795 A1 | 10/2003 | Lee et al. | 705/44 |
| 2003/0216173 A1 | 11/2003 | Gauselmann | |
| 2003/0216185 A1 | 11/2003 | Varley | |
| 2004/0068458 A1 | 4/2004 | Russo | |
| 2004/0078287 A1 | 4/2004 | Yang | |
| 2004/0100511 A1 * | 5/2004 | Wong et al. | 345/866 |
| 2004/0103054 A1 | 5/2004 | Singer | |
| 2004/0103127 A1 | 5/2004 | Bjornson et al. | 708/160 |
| 2004/0117292 A1 | 6/2004 | Brumfield et al. | 705/37 |
| 2004/0117358 A1 | 6/2004 | von Kaenel et al. | |
| 2004/0153394 A1 | 8/2004 | West et al. | |
| 2004/0167847 A1 | 8/2004 | Nathan | |
| 2004/0209596 A1 | 10/2004 | Wong et al. | 455/405 |
| 2004/0210504 A1 | 10/2004 | Rutman | |
| 2004/0224768 A1 | 11/2004 | Hussaini et al. | |
| 2004/0249699 A1 | 12/2004 | Laurent et al. | |
| 2005/0027642 A1 | 2/2005 | Howorka et al. | |
| 2005/0060255 A1 | 3/2005 | Heaton | |
| 2005/0125328 A1 | 6/2005 | Schluetter | |
| 2005/0137955 A1 | 6/2005 | Downie et al. | |
| 2005/0144113 A1 | 6/2005 | Opperman et al. | |
| 2005/0239523 A1 | 10/2005 | Longman et al. | 463/9 |
| 2005/0239524 A1 | 10/2005 | Longman et al. | 463/9 |
| 2006/0136759 A1 | 6/2006 | Koo | |
| 2006/0148559 A1 | 7/2006 | Jordan et al. | |
| 2006/0253384 A1 | 11/2006 | Rutt et al. | |
| 2006/0259417 A1 | 11/2006 | Marynowski et al. | |
| 2006/0265321 A1 | 11/2006 | Brumfield et al. | |
| 2007/0005481 A1 | 1/2007 | Kedia et al. | |
| 2007/0038549 A1 | 2/2007 | Janowski et al. | |
| 2007/0118452 A1 | 5/2007 | Mather et al. | |
| 2007/0150401 A1 | 6/2007 | Brucato et al. | |
| 2007/0188452 A1 | 8/2007 | Chen et al. | |
| 2007/0208647 A1 | 9/2007 | Gemuenden et al. | |
| 2008/0228618 A1 | 9/2008 | Noviello | |

FOREIGN PATENT DOCUMENTS

| | | | |
|---|---|---|---|
| EP | 0 813 175 A2 | 12/1997 | G07F 19/00 |
| EP | 0434224 B1 | 7/1999 | |
| EP | 0 813 175 A3 | 3/2000 | G07F 19/00 |
| EP | 0813175 A3 | 3/2000 | |
| EP | 1555603 A2 | 7/2005 | |
| GB | 2 392 763 | 3/2004 | H04L 9/32 |
| GB | 2392763 A | 3/2004 | |
| JP | 6-149460 | 5/1994 | |
| JP | 11-288352 | 10/1999 | |
| JP | 2002287876 A | 3/2001 | |
| JP | 2001-195475 | 7/2001 | |
| JP | 2001-312359 | 11/2001 | |
| JP | 2002-215298 | 7/2002 | |
| JP | 2002 287876 | 10/2002 | G06F 3/02 |
| JP | 2002-342021 | 11/2002 | |
| JP | 2003-24634 | 1/2003 | |
| JP | 2003-117237 | 4/2003 | |
| JP | 2004/30160 | 1/2004 | |
| JP | 2004/38953 | 2/2004 | G06F 17/60 |
| JP | 2004-272374 | 9/2004 | |
| JP | 2005-63409 | 3/2005 | |
| WO | WO 95/16971 | 6/1995 | G06F 157/00 |
| WO | WO 95/06918 | 9/1995 | |
| WO | WO 00/61252 | 10/2000 | A63F 13/12 |
| WO | WO 00/61252 A1 | 10/2000 | |
| WO | WO 01/25989 | 4/2001 | G06F 17/60 |
| WO | WO 01/26003 | 4/2001 | G06F 17/60 |
| WO | WO 01/71672 A1 | 9/2001 | |
| WO | WO/02/098054 | 12/2002 | |
| WO | WO 2004/036725 | 4/2004 | |
| WO | WO 2005/069819 A2 | 8/2005 | |

OTHER PUBLICATIONS

International Search Report for application PCT/US05/01084 (3 pages), Aug. 26, 2005.
Written Opinion of the International Searching Authority for application PCT/US05/01084 (10 pages), Aug. 26, 2005.
European Search Report for Application No. EP 05 25 0211 (3 pages), Mar. 31, 2006.
Notification of Transmittal of the International Search Report for International Application No. PCT/US06/23762 (3 pages), Dec. 1, 2006.
Written Opinion of the International Searching Authority for International Application No. PCT/US06/23762 (6 pages), Dec. 1, 2006.
Combined Search and Examination Report under Sections 17 and 18(3) for UK Patent Application No. GB0802593.4, UK Intellectual Property Office, Feb. 29, 2008 (9 pages).
Microsoft® Halo® User Guide, Bungie/Microsoft, pp. 6-7, available from http://downloads.planetmirror.com/pub/replacementdocs/Halo_-Manual_-_XBX.pdf (accessed May 22, 2007).
"The Ultimate XBOX Arcade Joystick," X-Arcade, available from http://web.archive.org/web/20031001102758/http://www.x-arcade.com/xbox.shtml (accessed Feb. 28, 2008).
U.S. Appl. No. 10/699,858 entitled *Keyboard Trading System* by Howard W. Lutnick, et al., 44 total pages, Filed Oct. 31, 2003.
Provisional Application entitled *Fully Configurable Trading Keyboard* by Howard W. Lutnick, et al., 10 total pages, Filed May 10, 2004.
U.S. Appl. No. 11/738,824 entitled *System and Method for Using a Game Controller Device for Electronic Trading* by James A. Longman, 29 total pages, Filed Apr. 23, 2007.

(56) References Cited

OTHER PUBLICATIONS

*Microsoft® Halo® User Guide*, Bungie/Microsoft, http://downloads.planetmirror.com/pub/replacementdocs/Halo - Manual - XBX.pdf; pp. 6-7, Accessed May 22, 2007.
*The Ultimate XBOX Arcade Joystick, X-Arcade*; http://web.archive.org/web/20031001102758 http://www.x-arcade.com/xbox/shtml; 4 pages, Accessed May 22, 2007.
*UK Intellectual Property Office Examination Report* for Application No. GB0500841.2; 5 pages, May 23, 2007.
Gamespy.com; "Console Gamepad Roundup. Getting a Grip on the hottest (and coolest) gamepads for console gaming." by Chuck Miller; Oct. 16, 2002 from http://archive.gamespy.com/hardware/october02/consolepads (accesses Jul. 2, 2008).
USPTO Office Action for U.S. Appl. No. 11/172,018, Jun. 7, 2010 (10 pages).
USPTO Pre-Brief Appeal Conference Decision for U.S. Appl. No. 11/686,695, Oct. 20, 2009 (2 pages).
Australian Examination Report for Application No. 2005206861, dated Feb. 23, 2010 (2 pages).
International Preliminary Report on Patentability for International Application No. PCT/US08/57021, dated Sep. 15, 2009 (5 pages).
International Preliminary Report on Patentability for International Application No. PCT/US2005/001084, dated Jul. 17, 2006 (9 pages).
Australian Examination Report for Application No. 2006266290, dated Jan. 22, 2009 (2 pages).
International Preliminary Report on Patentability for International Application No. PCT/US06/23762, dated Jan. 9, 2008 (6 pages).
International Preliminary Report on Patentability for International Application No. PCT/US06/23801, dated Jan. 9, 2008 (6 pages).
Canadian Examination Report for Application No. 2611879, dated Jun. 9, 2010 (3 pages).
UK Intellectual Property Office Decision on UK Patent Application No. GB0802593.4, dated Jan. 12, 2009 (12 pages).
European Patent Office Communication and Extended European Search Report for Application No. 06773508.4, dated Jul. 2, 2010 (8 pages).
United States Patent and Trademark Office; Office Action for U.S. Appl. No. 10/759,693, filed Jan. 15, 2004 in the name of James A. Longman; 17 pages, Jul. 5, 2005.
United States Patent and Trademark Office; Office Action for U.S. Appl. No. 10/759,693, filed Jan. 15, 2004 in the name of James A. Longman; 18 pages, Dec. 22, 2005.
United States Patent and Trademark Office; Advisory Action for U.S. Appl. No. 10/759,693, filed Jan. 15, 2004 in the name of James A. Longman; 3 pages, Apr. 20, 2006.
United States Patent and Trademark Office; Office Action for U.S. Appl. No. 10/759,693, filed Jan. 15, 2004 in the name of James A. Longman; 16 pages, Jul. 25, 2006.
United States Patent and Trademark Office; Notice of Allowance and Fee(s) Due for U.S. Appl. No. 10/759,693, filed Jan. 15, 2004 in the name of James A. Longman; 7 pages, Dec. 14, 2006.
UK Intellectual Property Office Examination Report for International Application No. GB0500841.2; 2 pages, Sep. 5, 2007.
Notification of Transmittal of the International Search Report and the Written Opinion of the International Searching Authority, or the Declaration for International Application No. PCT/US06/23801; 9 pages, Oct. 5, 2007.
USPTO Office Action for U.S. Appl. No. 11/171,809, Aug. 16, 2010 (15 pages).
Diane Kaye Walkowiak, Joysticks Get More From your Games by Fixing your Joystick, Smart Computing, Input & Output, Mar. 1998, vol. 2, Issue 1.
Tuan Le, Turn On The Sticky Keys Feature, Microsoft Corporation, Feb. 11, 2002.
Bill Camarda, Adding A New Auto Correct Entry, Special Edition Using Microsoft Office Word 2003, p. 293, Que Publishing (Dec. 2003).
USPTO Office Action for U.S. Appl. No. 11/172,018, Oct. 13, 2010 (20 pages).
Japanese Office Action with English translation for Application No. 2008-519371, mailed Sep. 14, 2010 (5 pages).
Australian Notice of Acceptance for Application No. 2006266299, dated Apr. 13, 2011 (3 pages).
Japanese Office Action with English translation for Application No. 2008-519364, mailed Jun. 7, 2011 (4 pages).
USPTO Office Action for U.S. Appl. No. 11/738,824, Jul. 14, 2011 (17 pages).
USPTO Office Action for Application No. 11/171,809, Jun. 24, 2011 (20 pages).
Maximum Windows 2000 Security by Mark Burnett et al., Copyright 2002.
USPTO Notice of Allowance and Fees Due and Examiner Interview Summary for U.S. Appl. No. 11/172,018, Jun. 24, 2011 (20 pages).
USPTO Office Action for U.S. Appl. No. 11/686,695, Nov. 14, 2008 (17 pages).
USPTO Office Action for U.S. Appl. No. 11/686,695, Jun. 25, 2009 (22 pages).
Notification of Transmittal of the International Search Report and the Written Opinion of the International Searching Authority for International Application No. PCT/US08/57021; Jun. 24, 2008 (9 pages).
Schwartz, Robert A., Next-Generation Securities Market Systems: An Experimental Investigation of Quote-Driven and Order-Driven Trading, Journal of Management Information Systems, vol. 14, No. 2, pp. 57-79; Date: Fall 1997.
Forsyth, Randall, W., Editor, "After the Fall Want to bet on—or against—the depressed buck? Electronic currency trading goes mainstream", The Electronic Investor, Barron's Technology Week, cover and pp. T4-T5; Date: Nov. 22, 2004.
USPTO Office Action for U.S. Appl. No. 11/738,824, Nov. 18, 2010 (15 pages).
Japanese Office Action with English translation for Application No. 2008-519364, mailed Nov. 16, 2010 (7 pages).
Canadian Examination Report for Application No. 2611880, dated Jul. 19, 2010 (3 pages).
Japanese Office Action with English translation for Application No. 2006-549590, mailed Dec. 14, 2010 (4 pages).
Japanese Office Action with English translation for Application No. 2008-519371, mailed Oct. 4, 2011 (9 pages).
Apple Computer, Inc., "Technical Note 2056: Installable Keyboard Layouts," dated Sep. 27, 2002 (retrieved from Internet Archive on Oct. 3, 2002 located at URL: http://web.archive.org/web/20021003023242/http://developer.apple.com/technotes/tn2002/tn2056.html).
Australian Notice of Acceptance for Application No. 2005206861, dated Nov. 23, 2011 (3 pages).
Japanese Office Action with English translation for Application No. 2006-549590, mailed Nov. 29, 2011 (4 pages).
Canadian Examination Report for Application No. 2553348, dated Dec. 21, 2011 (2 pages).
Canadian Notice of Allowance for Application No. 2553348, dated Oct. 12, 2012 (1 page).
Canadian Notice of Allowance for Application No. 2611879, dated May 2, 2012 (1 page).
Canadian Examination Report for Application No. 2611880, dated May 23, 2012 (4 pages).
Australian Examination Report for Application No. 2008201040, dated Nov. 12, 2012 (3 pages).
Japanese Office Action with English translation for Application No. 2008-65135, mailed Dec. 18, 2012 (4 pages).
Canadian Notice of Allowance for Application No. 2611880, dated Jan. 2, 2014 (1 page).
USPTO Notice of Panel Decision for U.S. Appl. No. 11/686,695, Sep. 25, 2013 (2 pages).
Japanese Office Action with English translation for Application No. 2008-65135, mailed Jul. 16, 2013 (4 pages).

\* cited by examiner

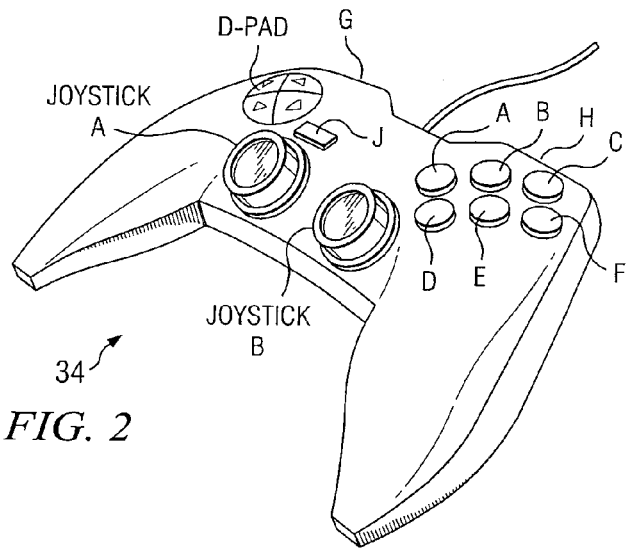

FIG. 2

| GAMEPAD CONTROL | TRADING SYSTEM COMMAND |
|---|---|
| D-PAD | CHANGE SELECTED INSTRUMENT IN CURRENT VIEW |
| JOYSTICK A | MOVE CURSOR AROUND SCREEN |
| JOYSTICK B (UP) | PRICE UP |
| JOYSTICK B (DOWN) | PRICE DOWN |
| JOYSTICK B (RIGHT) | SIZE UP |
| JOYSTICK B (LEFT) | SIZE DOWN |
| BUTTON G | BUY |
| BUTTON H | SELL |
| BUTTON G + BUTTON F | BID |
| BUTTON H + BUTTON F | OFFER |
| BUTTON J + BUTTON G | CANCEL BUY |
| BUTTON J + BUTTON H | CANCEL SELL |
| BUTTON J + BUTTON F + BUTTON G | CANCEL BID |
| BUTTON J + BUTTON F + BUTTON H | CANCEL OFFER |
| BUTTON A | PRICE IMPROVEMENT BEST |
| BUTTON J + BUTTON A | CYCLE PRICE IMPROVEMENT LEVEL |
| BUTTON B | DIRECT DEALING (REQUEST FOR QUOTE) |
| BUTTON J + BUTTON B | TWO-WAY DIRECT DEALING (REQUEST FOR QUOTE) |
| BUTTON C | DELETE COMMANDLINE |
| BUTTON J + BUTTON C | BACKSPACE IN COMMANDLINE |
| BUTTON E | LIMIT |
| BUTTON F | MOUSE LEFT CLICK |
| BUTTON J + BUTTON F | MOUSE RIGHT CLICK |
| BUTTON D + D-PAD | CHANGE SELECTED FIELD WITHIN SELECTED INSTRUMENT |

FIG. 3

SYSTEM AND METHOD FOR USING A GAME CONTROLLER DEVICE FOR ELECTRONIC TRADING

CROSS-REFERENCE TO RELATED APPLICATION

This application is a continuation of U.S. patent application Ser. No. 10/759,693 filed Jan. 15, 2004, entitled System and Method for Using a Game Controller Device for Electronic Trading.

TECHNICAL FIELD OF THE INVENTION

This invention relates in general to electronic trading and, more particularly, to a system and method for using a game controller device for electronic trading.

BACKGROUND OF THE INVENTION

In recent years, electronic trading systems have gained a widespread acceptance for trading items. For example, electronic trading systems have been created which facilitate the trading of financial instruments such as stocks, bonds, currency, futures, or other suitable financial instruments. Such electronic trading systems often have a number of clients or terminals connected to a trading platform by a communications network, such as the Internet or a virtual private network, for example. Each client or terminal of such a trading system may include various input devices, such as keyboards or mouses. In some instances, users may use keyboards that are specifically designed or configured for use in an electronic trading system.

SUMMARY OF THE INVENTION

In accordance with the present invention, systems and methods for using an interface device for electronic trading are provided.

According to one embodiment, a system for electronic trading is provided. The system includes an interface application having an associated mapping module that defines a plurality of controller signal relationships. Each controller signal relationship associates a game controller signal with a trading system command associated with the electronic trading of financial instruments. The interface application is operable to receive a particular game controller signal, determine the trading system command associated with the particular game controller signal using the mapping module, and communicate the determined trading system command such that the trading system command is executed.

According to another embodiment, a method of electronic trading is provided. A plurality of controller signal relationships are managed. Each controller signal relationship associates a game controller signal with a trading system command associated with the electronic trading of financial instruments via a trading platform. A particular game controller signal generated by a game controller is received. The trading system command associated with the particular game controller signal is determined based on the controller signal relationships. The determined trading system command is communicated toward the trading platform such that the trading system command may be executed by the trading platform.

Various embodiments of the present invention may benefit from numerous advantages. It should be noted that one or more embodiments may benefit from some, none, or all of the advantages discussed below.

One advantage of the invention is that a game controller, such as a gamepad or joystick, may be used to trade electronically tradable instruments or other items via a trading system. This may allow users to performing various trading functions with greater speed and accuracy than with other input devices, such as keyboard or mouses. In addition, some users may be more familiar with using a game controller than using a keyboard or mouse.

Another advantage of the invention is a user terminal may store game controller configurations for various types and/or models of game controllers such that different types and/or models of game controllers may be used interchangeably with a particular user terminal. In addition, a game controller may be configurable such that a user may configure the game controller as he or she desires. Thus, the game controller may be personalized for the user, which may further increase the speed and accuracy with which the user can perform trading functions, such as buying or selling financial instruments, for example.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which:

FIG. 2 illustrates an example game controller device for use in the trading system shown in FIG. 1;

FIG. 3 illustrates a table that specifies example default controller signal relationships for the game controller device shown in FIG. 2 in accordance with one embodiment of the invention;

DETAILED DESCRIPTION OF THE DRAWINGS

Example embodiments of the present invention and their advantages are best understood by referring now to FIGS. 1 through 5 of the drawings, in which like numerals refer to like parts.

In general, a game controller device, such as a gamepad or joystick, is used to interface with a electronic trading system, such as to place orders to buy or sell financial instruments, for example. Configurations for various types and/or models of game controllers may be stored and managed such that different types and/or models of game controllers may be used interchangeably at a user terminal. In addition, a game controller may be configurable such that a user may configure the game controller as he or she desires.

Figure 1:
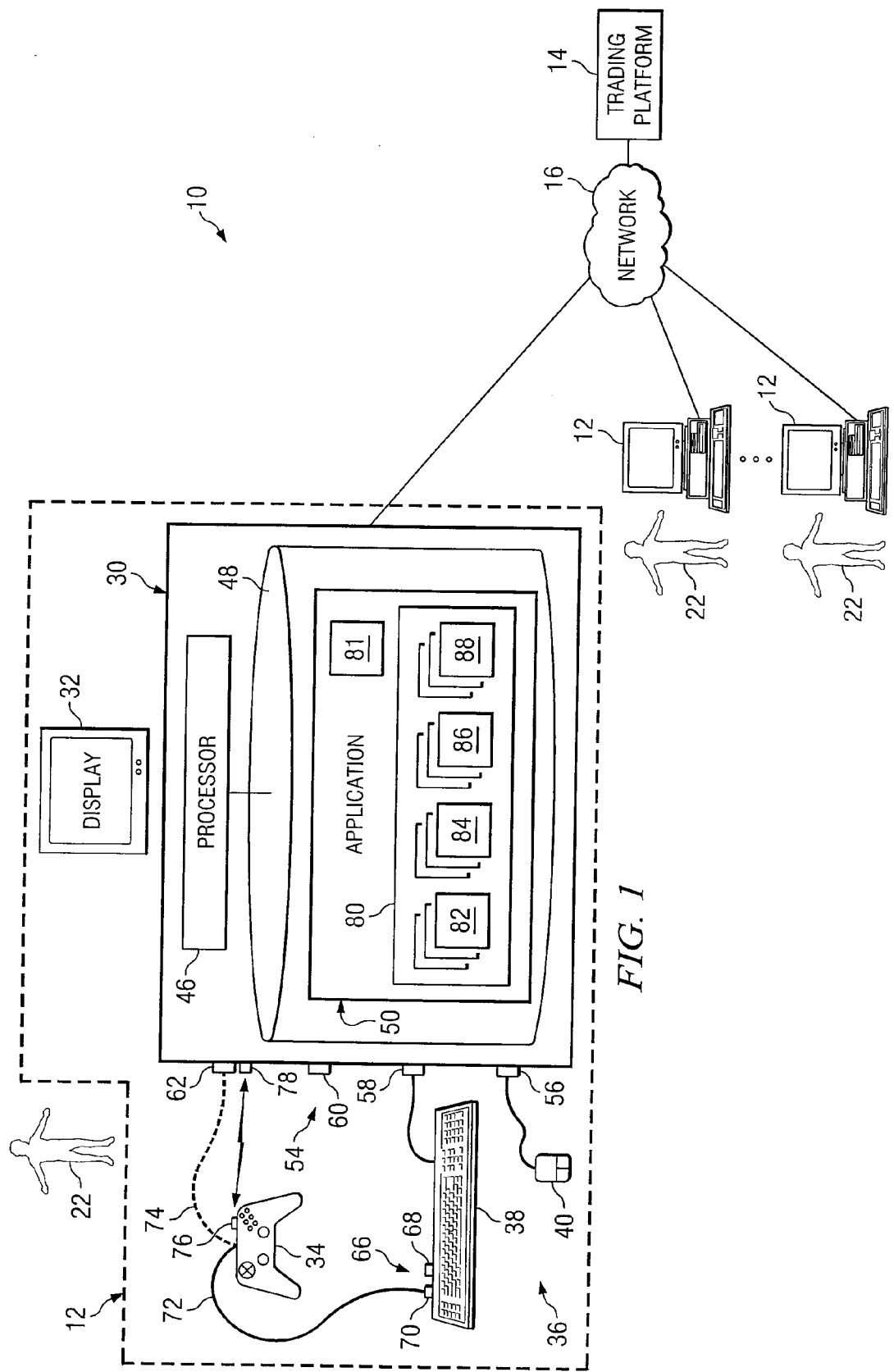
FIG. 1 illustrates an example trading system in which a user may engage in trading activity using a game controller device according to an embodiment of the present invention.

FIG. 1 illustrates an example trading system 10 in which a user may engage in trading activity using a game controller device according to an embodiment of the present invention. As shown, system 10 includes a number of user terminals 12 coupled to a trading platform 14 by a communications network 16. User terminals 12 provide users 22 access to engage in trading activity via trading platform 14. A user 22 is any entity, such as an individual, group of individuals or firm, that engages in trading activity via trading system 10.

Trading platform 14 is a trading architecture that facilitates the electronic trading of financial instruments, such as stocks or other equity securities, bonds, mutual funds, options, futures, derivatives, and currencies, for example, or any other suitable instruments, goods or services between users 22. Trading platform 14 may be a computer, a server, a management center, a single workstation, or a headquartering office for any person, business, or entity that seeks to manage trading between users 22 of system 10. Accordingly, trading platform 14 may include any suitable hardware, software, personnel, devices, components, elements, or objects that may be utilized or implemented to achieve the operations and functions of an administrative body or a supervising entity that manages or administers a trading environment.

Trading platform 14 may be operable to receive trading orders from users 22 and to manage or process those trading orders such that financial transactions between users 22 may be performed. Trading module may have a link or a connection to a market trading floor, or some other suitable coupling to any suitable element that allows for such transactions to be executed.

Communications network 16 is a communicative platform operable to exchange data or information between trading platform 14 and user terminals 30. Communications network 16 represents an Internet architecture in a particular embodiment of the present invention, which provides users 22 with the ability to electronically execute trades or initiate transactions to be delivered to an authorized exchange trading floor. In other embodiments, communications system 14 could be any packet data network (PDN) offering a communications interface or exchange between trading platform 14 and user terminals 30. Communications network 16 may alternatively be any local area network (LAN), metropolitan area network (MAN), wide area network (WAN), wireless local area network (WLAN), virtual private network (VPN), intranet, or any other appropriate architecture or system that facilitates communications in a network environment.

A user terminal 12 may include a computer system and appropriate software to allow user 22 to engage in trading activity via trading platform 14. As used in this document, the term "computer" refers to any suitable device operable to accept input, process the input according to predefined rules, and produce output, for example, a personal computer, workstation, network computer, wireless data port, wireless telephone, personal digital assistant, one or more processors within these or other devices, or any other suitable processing device.

As shown in FIG. 1, a user terminal 12 may include a terminal body 30, a display device 32, and a game controller input device 34. User terminal 12 may also include one or more additional input devices 36, such as a keyboard 38 and a mouse 40. Display device 32 may be any suitable device for displaying information to a user 22, such as an internal notebook display, a CRT monitor, or a television, for example.

Terminal body 30 includes a processing unit 46 and a memory unit 48 that stores an interface application 50, which is discussed below. Processing unit 46 may process data associated with system 10, which may include executing coded instructions associated with interface application 50. Memory unit 46 may be coupled to data processing unit 46 and may include one or more databases and other suitable memory devices, such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors.

Terminal body 30 also includes one or more input ports 54, each of which provides an interface for coupling game controller input device 34, one or more additional input devices 36 and/or other peripheral devices to interface application 50. Input ports 54 may include various types of interfaces, such as USB type ports (such as USB type I or type II ports, for example), keyboard ports, mouse ports, serial ports, parallel ports, or Bluetooth™ or FireWire™ ports, for example. In the example embodiment shown in FIG. 1, terminal body 30 includes a mouse port 56 for mouse 40, a keyboard port 58 for keyboard 38, a serial port 60, and a USB type port 62. In this embodiment, game controller device 34 may be coupled to either serial port 60 or USB type port 62, depending on the type of cable and/or plug provided by the game controller device 34.

In addition, keyboard 38 may include one or more input ports 64 that allow other input devices to be plugged into keyboard 38. Signals generated by an input device connected to an input port 64 provided by keyboard 38 are routed through keyboard 38 and keyboard port 58 to which keyboard 38 is coupled. In the embodiment shown in FIG. 1, keyboard 38 is a customized keyboard 38 designed for electronic trading applications, and includes a serial port 68 and a USB type port 70. In some embodiments, a particular game controller device 34 may be able to be coupled directly to an input port 54 of terminal body 30, or to an input port 66 of keyboard 38, which is in turn connected to keyboard port 58 of terminal body 30. In the embodiment shown in FIG. 1, game controller device 34 includes a USB cable 72 which may be plugged into USB type port 70 of keyboard 38 or directly into USB type port 62 of terminal body 30 (as shown by dotted line 74). Alternatively, game controller device 34 may communicate with interface application 50 at least in part via wireless communications. For example, as shown in FIG. 1, game controller device 34 may include a wireless transceiver 76 that may communicate wirelessly with a wireless transceiver 78 associated with terminal body 30. Such wireless communications may utilize any suitable wireless communications protocol or protocols.

Game controller input device 34 may be any of a variety of input devices used in connection with video or computer gaming, such as a handheld video game controller, a joystick or a gamepad, for example. Some game controller devices 34 include a number of buttons as well as one or more joysticks or directional pads (D-pads). The depression or manipulation of such buttons, joysticks and/or D-pads by a user 22 generates game controller signals which may be received and interpreted by interface application 50 in order to generate commands related to the functions of trading system 10, as discussed below. Similarly, keyboard 38 and mouse 40 may generate keyboard signals and mouse signals, respectively, which may be received and interpreted by interface application 50 in order to generate commands related to the functions of trading system 10.

Interface application 50 includes one or more applications and modules that provide interfaces that allow user 22 to communicate with trading platform 14 using various input devices 34 and display device 32. For example, such applications and modules may include graphical user interface (GUI) applications that generate displays of information on display device 32, receive and interpret commands from input devices 34 in order to cause changes to the active display on display device 32 and to generate and send messages to trading platform 14, and receive and interpret messages from trading platform 14 in order to cause changes to the active display on display device 32 and/or to generate and send messages to input devices 34. Interface application 50 may include any suitable software or coded instructions for providing at least the various functionality discussed herein with reference to interface application 50.

In the embodiment shown in FIG. 1, interface application 50 includes a mapping module 80 and a configuration module 81. Mapping module 80 defines various relationships for mapping signals received from various input devices 34 with various commands regarding trading system 10. Mapping module 80 includes controller signal relationships 82, keyboard signal relationships 84, and mouse signal relationships 86. Each controller signal relationship 82 associates a game controller signal generated by a game controller device 34 with a trading system command associated with trading system 10. Each trading system command may be a control instruction to alter or manipulate the current display shown on display device 32 (such as an instruction to move a cursor across the display 32, for example) and/or a trading instruction that may be communicated to or from trading platform 14 (such as an instruction to buy, sell, or increase a price, for example).

Mapping module 80 may include sets of such controller signal relationships 82 for various types or models of game controller devices 34, as well as for various users 22. Thus, if more than one type or model of game controller device 34 is used with a particular user terminal 30, controller signal relationships 82 specific to each type or model of game controller device 34 may be stored in and retrieved from mapping module 80. In addition, if more than one user 22 uses a particular user terminal 30, controller signal relationships 82 specific to each such user may be stored in and retrieved from mapping module 80. The controller signal relationships 82 for each type or model of game controller device 34 and/or for each user 22 may be configurable or reconfigurable such that each user 22 may create his or her own desired configuration. In addition, each type or model of game controller device 34 may have a default configuration of controller signal relationships 82 maintained by mapping module 80.

Similar to controller signal relationships 82, each keyboard signal relationship 84 associates a keyboard signal generated by a keyboard 38 with a trading system command associated with trading system 10. Similarly, each mouse signal relationship 86 associates a mouse signal generated by a mouse 40 with a trading system command associated with trading system 10.

Mapping module 80 may also include one or more sets of feedback signal relationships 88, each associating a signal generated by trading platform 14 with a controller feedback command. Controller feedback commands are commands that may be used by game controller device 34 to provide feedback to a user 22 of game controller device 34. For example, controller feedback commands may include commands which cause game controller device 34 to rumble (i.e., vibrate) or light up. In one embodiment, feedback signal relationships 88 for a particular game controller device 34 include a relationship between an "executed trade" signal generated by trading platform 14 and a "rumble" command for game controller device 34. Thus, when trading platform 14 executes a trade involving a user 22, trading platform 14 generates and communicates an "executed trade" signal to interface application 50, which translates the signal into a "rumble" command and communicates the "rumble" command to game controller device 34, thus causing the game controller device 34 to vibrate.

Configuration module 81 cooperates with mapping module 80 to allow users 22 to configure (or generate) and/or reconfigure various controller signal relationships 82. In some embodiments, configuration module 81 provides a controller configuration GUI on display device 32 that allows a user 22 to configure, or generate, a set of controller signal relationships 82 associated with an unconfigured game controller device 34, as well as to reconfigure the set of controller signal relationships 82 associated with a previously configured game controller device 34. In a particular embodiment, the controller signal relationships 82 associated with a game controller device 34 may be reconfigured any number of times.

Mapping module 80 and configuration module 81 may include all or portions of the software or coded instructions associated with interface application 50. Mapping module 80 and configuration module 81 may also be partially or completely integrated. In addition, multiple instances of mapping module 80 and/or configuration module 81 may be provided by application 50.

FIG. 2 illustrates an example game controller device 34 for use in trading system 10. Game controller device 34 is a gamepad that includes a D-pad, a pair of joysticks (Joystick A and Joystick B), and nine buttons (Button A through Button J). FIG. 3 illustrates a table 90 that specifies example default controller signal relationships 82 for the game controller device 34 of FIG. 2 in accordance with one embodiment of the invention. As shown in FIG. 3, each controller signal relationship 82 is a relationship between the signal(s) produced by the manipulation of one or more gamepad controls and a trading system command.

Figure 4:
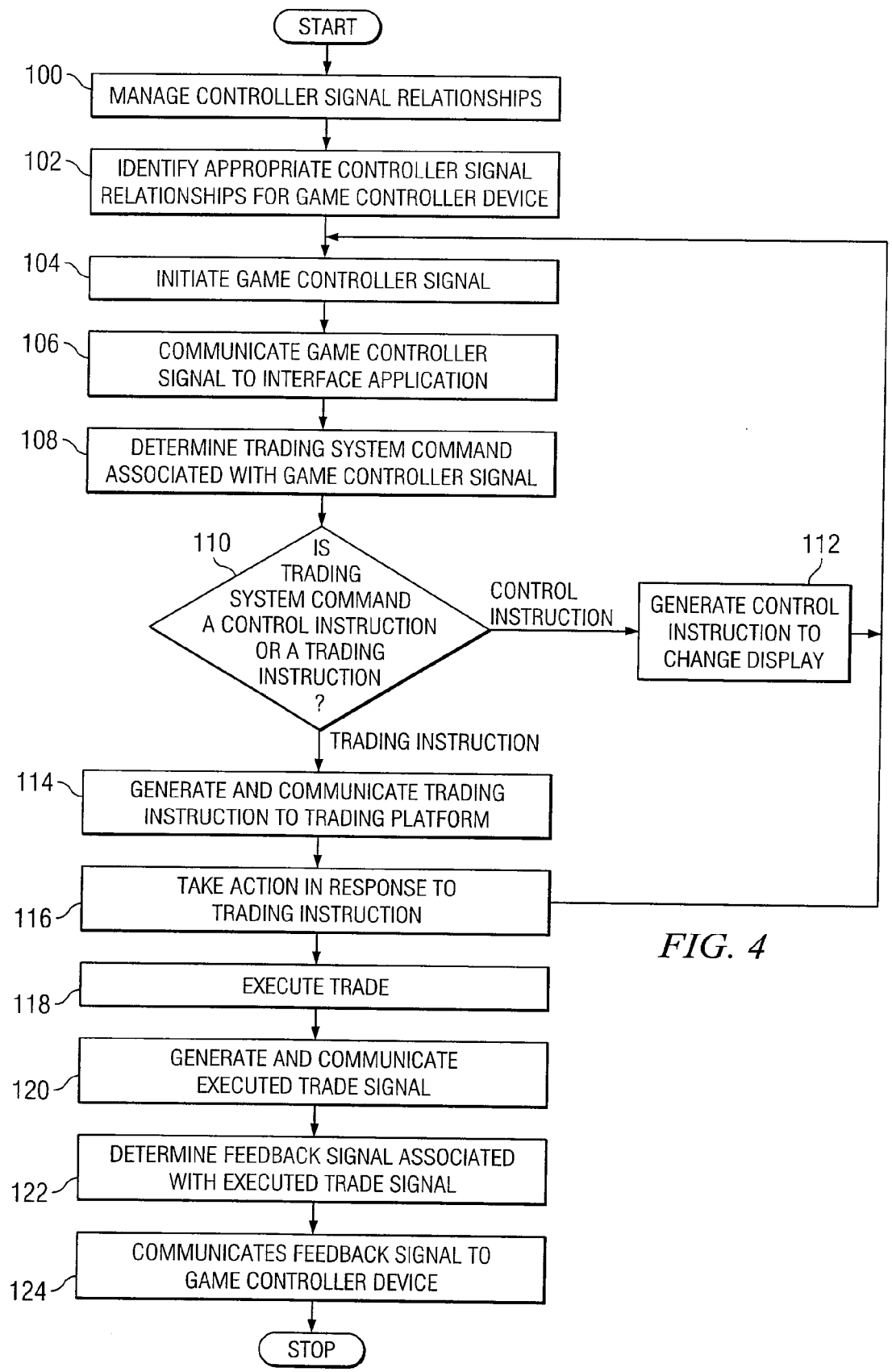
FIG. 4 illustrates an example method of a user engaging in electronic trading via trading platform using the game controller device shown in FIG. 2 and configured according to FIG. 3.

FIG. 4 illustrates an example method of a user 22 engaging in electronic trading via trading platform 14 using the game controller device 34 shown in FIG. 2 and configured as described above according to an embodiment of the present invention. In this embodiment, the game controller device 34 is connected to a serial port 68 provided by a keyboard 38 at a user terminal 12, which in turn is connected to a keyboard port 58 of the terminal body 30 of the user terminal 12. Thus, game controller signals generated by game controller device 34 are routed to application 50 via keyboard 38.

At step 100, mapping module 80 of interface application 50 manages various sets of controller signal relationships 82, keyboard relationships 84, and mouse relationships 86 which map input signals with commands associated with trading activity within trading system 10. The controller signal relationships 82 include the set of relationships shown in FIG. 3, which are the specific to the type and model of game controller device 34. At step 102, the appropriate set of controller signal relationships 82 for game controller device 34 are identified from mapping module 80. This may involve any suitable steps or processes. For example, interface application 50 may automatically identify the type and/or model of game controller device 34 based on signals or messages received from game controller device 34, such as a control message, for example. As another example, the user 22 may identify the type and/or model of game controller device 34 using a GUI displayed to the user 22 by interface application 50, such as by selecting the appropriate type and/or model from a list of different game controller device types and/or models. In addition, if user 22 had previously reconfigured the controller signal relationships 82 for game controller device 34, interface application 50 may identify the appropriate controller signal relationships 82 for user 22 and game controller device 34. For example, interface application 50 may identify user 22 (such as from a user ID entered by user 22, for example) and present to the user 22 a display listing one or more sets of controller signal relationships 82 that have been stored at mapping module 80 in association with user 22. User 22 may then select from the list the desired set of controller signal relationships 82.

At step 104, user 22 initiates a game controller signal by moving the D-pad or joysticks and/or depressing one or more buttons of game controller device 34. At step 106, the game controller signal is communicated from game controller device 34 to application 50 via serial port 68, keyboard 38, and keyboard port 58. At step 108, interface application 50 determines the trading system command associated with the received game controller signal using the appropriate controller signal relationships 82 identified at step 102, and acts accordingly. At step 110, interface application 50 determines whether the determined trading system command is a control instruction to alter or manipulate the current display shown on display device 32 or a trading instruction to be communicated to trading platform 14. If the trading system command is a control instruction, interface application 50 generates the control instruction at step 112, which results in the appropriate change or manipulate the current display. For example, if the game controller signal was generated by user 22 moving Joystick A (which is associated with a "move cursor" command, as shown in FIG. 3), interface application 50 will cause the cursor to be moved around the screen.

Alternatively, if the trading system command is a trading instruction, interface application 50 generates and communicates the appropriate trading instruction to trading platform 14 at step 114. The appropriate action is taken by trading platform 14 in response to the received trading instruction at step 116. For example, if the game controller signal was generated by user 22 depressing both Button 7 and Button 6 (which is associated with a "bid" command, as shown in FIG. 3), interface application 50 will generate and communicate to trading platform 14 an instruction to place a particular bid for user 22 at step 114, and trading platform 14 will receive the instruction and place the bid on trading platform 14 at step 116. Steps 104 through 116 are repeated as user 22 continues to interact with interface application 50 using game controller device 34 in order to engage in trading activity with trading platform 14.

At step 118, trading platform 14 executes a trade between an buy order placed by user 22 and a sell order placed by another user 22' of system 10. At step 120, trading platform 14 generates and communicates to interface application 50 a signal indicating that the buy order was executed for user 22. At step 122, interface application 50 determines, using appropriate feedback signal relationships 88, that the received signal is associated with a "rumble" controller feedback command. At step 124, interface application 50 communicates the "rumble" command to game controller device 34, which causes game controller device 34 to rumble, or vibrate.

Figure 5:
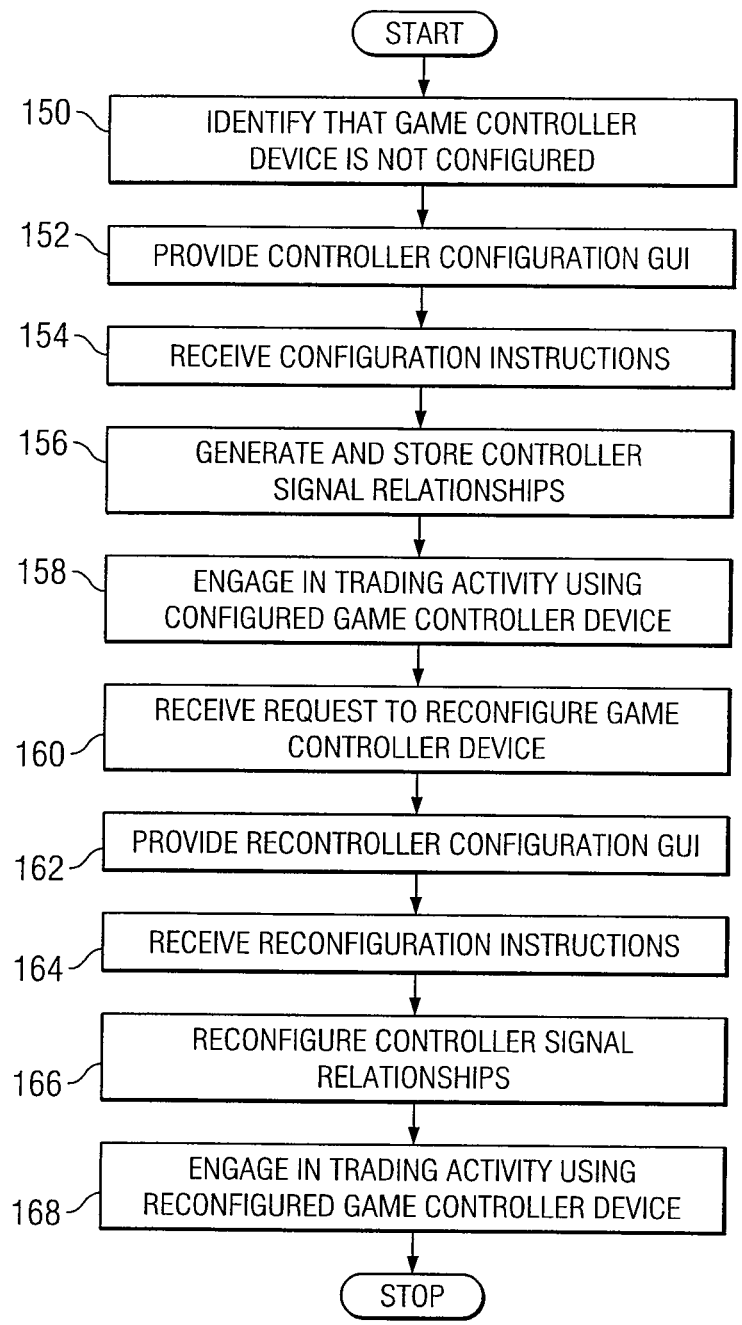
FIG. 5 illustrates an example method of configuring and reconfiguring the controller signal relationships associated with a game controller device according to one embodiment of the invention.

FIG. 5 illustrates an example method of configuring and reconfiguring the controller signal relationships 82 associated with a game controller device 34 according to one embodiment of the invention. At step 150, interface application identifies that a game controller device 34 connected to terminal body 30 is not configured. At step 152, configuration module 81 provides a controller configuration GUI on display device 32 that allows user 22 to configure, or generate, a set of controller signal relationships 82 for the unconfigured game controller device 34. At step 154, user 22 generates and communicates configuration instructions to configuration module 81 via the controller configuration GUI, such as by making selections using the game controller device 34 or another input device 36, such as a keyboard 38 or mouse 40. At step 156, configuration module 81 generates controller signal relationships 82, which are stored by mapping module 80 in association with the game controller device 34 and/or user 22. At step 158, user 22 engages in trading via trading platform 14 using the configured game controller device 34.

At some subsequent time, user 22 wishes to reconfigure one or more of the controller signal relationships 82 for the game controller device 34. At step 160, user 22 submits a request to reconfigure controller signal relationships 82 for game controller device 34. At step 162, configuration module 81 provides a controller reconfiguration GUI on display device 32 that allows user 22 to reconfigure the existing set of controller signal relationships 82 for the game controller device 34. The controller reconfiguration GUI may be similar or identical to the controller configuration GUI discussed above with reference to step 152. At step 164, user 22 generates and communicates reconfiguration instructions to configuration module 81 via the controller reconfiguration GUI, such as by making selections using the game controller device 34 or another input device 36, such as a keyboard 38 or mouse 40. At step 166, configuration module 81 reconfigures, or changes, one or more controller signal relationships 82, which changes are then stored by mapping module 80. At step 168, user 22 engages in trading via trading platform 14 using the reconfigured game controller device 34.

Modifications, additions, or omissions may be made to the method without departing from the scope of the invention. Additionally, steps may be performed in any suitable order without departing from the scope of the invention.

Although an embodiment of the invention and its advantages are described in detail, a person skilled in the art could make various alterations, additions, and omissions without departing from the spirit and scope of the present invention as defined by the appended claims.

What is claimed is:
1. A system for electronic trading, comprising:
a memory having stored therein:
  a first set of controller signal relationships, the first set associated with a game controller, a first user and a first type of game controller;
  a second set of controller signal relationships, the second set associated with the game controller, a second user and a second type of game controller, in which the second type of game controller comprises a first joystick and a second joystick each configured for movement away from a center position in a plurality of directions spanning 360 degrees, in which the second set of controller signal relationships associates at least one first transaction system command with one or more controller signals associated with movement of the first joystick in a first direction and associates at least one second transaction system command with one or more controller signals associated with movement of the second joystick in a second direction; and
  a third set of controller signal relationships, the third set associated with the second user and the first type of game controller;
wherein at least one controller signal relationship associates one of a plurality of game controller signals with one of a plurality of transaction system commands associated with a transaction system; and
a processor communicatively coupled to the memory and operable to:
  present a controller configuration interface for display to the first user;

receive via the controller configuration interface one or more configuration instructions;

generate at least one controller signal relationship for the first set of controller signal relationships based at least in part upon the received configuration instructions;

generate at least one controller signal relationship for the second set of controller signal relationships; and generate at least one controller signal relationship for the third set of controller signal relationships.

2. The system of claim 1, wherein the processor is further operable to:

receive via the controller configuration interface one or more reconfiguration instructions associated with the first user; and reconfigure the first set of controller signal relationships based on the received reconfiguration instructions.

3. The system of claim 1, wherein the processor is further operable to:

receive a particular game controller signal from the game controller;

access at least one of the stored sets of controller signal relationships based at least in part on an identified user of the game controller;

determine the transaction system command associated with the particular game controller signal based at least in part on the at least one determined set of controller signal relationships; and communicate the determined transaction system command.

4. The system of claim 3, wherein the game controller generates the particular game controller signal in response to at least one of:

a depression of one button;

a substantially simultaneous depression of a plurality of buttons;

a movement of a joystick;

a substantially simultaneous movement of a joystick and depression of one or more buttons;

a movement of a D-pad; and a substantially simultaneous movement of a D-pad and depression of one or more buttons.

5. The system of claim 1, wherein the memory is further operable to store one or more feedback signal relationships, each feedback signal relationship associating a transaction platform signal with a controller feedback command; and wherein the processor is further operable to:

receive a particular transaction platform signal from a transaction platform;

determine the controller feedback command associated with the particular transaction platform signal using the one or more feedback signal relationships; and communicate the determined controller feedback command toward the game controller.

6. The system of claim 1, wherein the determined controller feedback command comprises a command to vibrate the game controller, wherein the first joystick of the second game controller is configured to move a cursor in a user interface for entering transaction commands, and wherein the second joystick of the second game controller is configured to input transaction commands in the user interface for entering transaction commands comprising transaction system commands associated with an electronic transaction system.

7. The system of claim 1, wherein:

the game controller comprises a light source; and the determined controller feedback command is to activate the light source.

8. The system of claim 1, in which the processor is further operable to:

receive via the controller configuration interface a second and third set of configuration instructions;

wherein the act of generating at least one controller signal relationship for the second set of controller signal relationships comprises generating at least one controller signal relationship for the second set of controller signal relationships based at least in part upon the received second configuration instructions; and wherein the act of generating at least one controller signal relationship for the third set of controller signal relationships comprises generating at least one controller signal relationship for the third set of controller signal relationships based at least in part upon the received third configuration instructions.

9. A method comprising:

storing therein by at least one processor a first set of controller signal relationships associated with a first user and a first type of game controller; and storing therein by the at least one processor a second set of controller signal relationships associated with a second user and a second type of game controller, in which the second type of game controller comprises a first joystick and a second joystick each configured for movement away from a center position in a plurality of directions spanning 360 degrees, in which the second set of controller signal relationships associates at least one first transaction system command with one or more controller signals associated with movement of the first joystick in a first direction and associates at least one second transaction system command with one or more controller signals associated with movement of the second joystick in a second direction;

storing therein by the at least one processor a third set of controller signal relationships, the third set associated with the second user and the first type of game controller;

wherein at least one controller signal relationship associates one of a plurality of game controller signals with one of a plurality of transaction system commands associated with an electronic transaction system;

presenting by the at least one processor a controller configuration interface for display to the first user;

receiving by the at least one processor via the controller configuration interface one or more configuration instructions;

generating by the at least one processor at least one controller signal relationship for the first set of controller signal relationships based at least in part upon the received configuration instructions;

generating by the at least one processor at least one controller signal relationship for the second set of controller signal relationships; and generating by the at least one processor at least one controller signal relationship for the third set of controller signal relationships.

10. The method of claim 9, further comprising:

receiving via the controller configuration interface one or more reconfiguration instructions associated with the first user; and reconfiguring the first set of controller signal relationships based on the received reconfiguration instructions.

11. The method of claim 9, further comprising:
receiving a particular game controller signal from the game controller;
accessing at least one of the stored sets of controller signal relationships based at least in part on an identified user of the game controller;
determining the transaction system command associated with the particular game controller signal based at least in part on the at least one determined set of controller signal relationships; and
communicating the determined transaction system command.

12. The method of claim 11, wherein the particular game controller signal is generated by the game controller in response to at least one of:
a depression of one button;
a substantially simultaneous depression of a plurality of buttons;
a movement of a joystick;
a substantially simultaneous movement of a joystick and depression of one or more buttons;
a movement of a D-pad; and
a substantially simultaneous movement of a D-pad and depression of one or more buttons.

13. The method of claim 9, further comprising:
storing one or more feedback signal relationships, each feedback signal relationship associating a transaction platform signal with a controller feedback command;
receiving a particular transaction platform signal associated with a transaction platform;
determining the controller feedback command associated with the particular transaction platform signal using the one or more feedback signal relationships; and
communicating the determined controller feedback command toward the game controller.

14. The method of claim 13,
wherein the determined controller feedback command comprises a command to vibrate the particular game controller,
wherein the first joystick of the second game controller is configured to move a cursor in a user interface for entering transaction commands, and
wherein the second joystick of the second game controller is configured to input transaction commands in the user interface for entering transaction commands comprising transaction system commands associated with an electronic transaction system.

15. A method comprising:
storing therein by at least one processor in at least one database a first set of controller signal relationships associated with a first type of game controller and a first user;
storing therein by the at least one processor in the at least one database a second set of controller signal relationships associated with a second type of game controller and a second user, in which the second type of game controller comprises a first joystick and a second joystick each configured for movement away from a center position in a plurality of directions spanning 360 degrees, in which the second set of controller signal relationships associates at least one first transaction system command with one or more controller signals associated with movement of the first joystick in a first direction and associates at least one second transaction system command with one or more controller signals associated with movement of the second joystick in a second direction;
storing therein by the at least one processor in the at least one database a third set of controller signal relationships, the third set associated with the second user and with the first type of game controller;
wherein at least one controller signal relationship associates one of a plurality of game controller signals with one of a plurality of transaction system commands associated with electronic transaction of financial instruments;
receiving by the at least one processor one or more configuration instructions;
generating by the at least one processor at least one controller signal relationship for the first set of controller signal relationships based at least in part upon the received configuration instructions;
generating by the at least one processor at least one controller signal relationship for the second set of controller signal relationships; and
generating by the at least one processor at least one controller signal relationship for the third set of controller signal relationships.

16. The method of claim 15, further comprising reconfiguring the first set of controller signal relationships based on the received reconfiguration instructions.

17. The method of claim 15, further comprising:
receiving a particular game controller signal from the game controller;
accessing at least one of the stored sets of controller signal relationships based at least in part on an identified type of the game controller;
determining the transaction system command associated with the particular game controller signal based at least in part on the at least one determined set of controller signal relationships; and
communicating the determined transaction system command.

18. The method of claim 17, wherein the particular game controller signal is generated by the game controller in response to at least one of:
a depression of one button;
a substantially simultaneous depression of a plurality of buttons;
a movement of a joystick;
a substantially simultaneous movement of a joystick and depression of one or more buttons;
a movement of a D-pad; and
a substantially simultaneous movement of a D-pad and depression of one or more buttons.

19. The method of claim 15, further comprising:
storing one or more feedback signal relationships, each feedback signal relationship associating a transaction platform signal with a controller feedback command;
receiving a particular transaction platform signal associated with a transaction platform;
determining the controller feedback command associated with the particular transaction platform signal using the one or more feedback signal relationships; and
communicating the determined controller feedback command toward the game controller.

20. The method of claim 19, wherein the determined controller feedback command comprises a command to vibrate the particular game controller.

* * * * *